United States Patent [19]

Nelson

[11] Patent Number: 4,806,320

[45] Date of Patent: Feb. 21, 1989

[54] PROCESS FOR NOX CONTROL

[75] Inventor: Sidney G. Nelson, Hudson, Ohio

[73] Assignee: Sanitech, Inc., Twinsburg, Ohio

[21] Appl. No.: 184,885

[22] Filed: Apr. 21, 1988

[51] Int. Cl.[4] .......................... B01J 8/00; C01B 17/00
[52] U.S. Cl. .................................................... 423/239
[58] Field of Search .................. 423/239, 239 A, 235, 423/235 D

[56] References Cited

U.S. PATENT DOCUMENTS

| 3,757,489 | 9/1973 | Evanshen | 55/74 |
| 4,025,604 | 5/1977 | Moriguchi et al. | 423/239 |
| 4,186,109 | 1/1980 | Atsckawa et al. | 423/239 |
| 4,188,365 | 2/1986 | Yoshioka et al. | 423/239 |
| 4,280,926 | 7/1981 | Abe et al. | 423/239 |

Primary Examiner—Gregory A. Heller

[57] ABSTRACT

A process is described for reducing the levels of nitrogen oxides present in flue gases from stationary sources. The process consists of mixing ammonia or methane with the flue gas and then passing the mixtures through a bed of expanded vermiculite, the latter serving as a catalyst for reactions between the nitorgen oxides and ammonia or methane. The reactions result in the formation of nitrogen and water and/or carbon dioxide.

5 Claims, No Drawings

PROCESS FOR NOX CONTROL

TECHNICAL FIELD

This invention relates to a pollution control process and more particularly to a process that removes and destroys nitrogen oxides that occur in flue gases generated by stationary sources.

BACKGROUND OF THE INVENTION

Nitrogen oxide emissions, principally nitrogen dioxide ($NO_2$) and nitric oxide (NO) and referred to collectively as NOx, are a major environmental concern owing to their toxic and damaging nature. Of all nitrogen oxide emissions produced in the U.S., 55 percent are attributed to stationary sources, such as utility boilers, industrial boilers, gas turbines and stationary engines. The U.S. Environmental Protection Agency has promulgated New Source Performance Standards (NSPS) to define the limits of various pollutants permitted from new stationary sources.

Many times when fuels are burned, NOx levels exceeding NSPS occur. These violations of NSPS standards are becoming of increased concern. Three approaches that can be taken to reduce NOx emissions are: (1) Making changes before combustion; (2) Making modifications during combustion; and (3) Adding controls after combustion. Typical precombustion approaches are fuel switching, emulsifying the fuel with water, and denitrifying the fuel. Typical combustion modification techniques are changing stoichiometry, reducing temperature, and reducing residence time. Adding controls after combustion is generally referred to as flue-gas treatment.

NOx reduction during combustion has been employed since the early 1970's to obtain limited NOx emission reductions. It is the most common NOx emission reduction approach being used today to achieve moderate control. To obtain higher levels of NOx reduction, it is generally necessary to employ a flue-gas treatment approach, or a combination of approaches.

Flue-gas treatment processes are of two types, dry processes and wet processes. Some processes are designed for the simultaneous removal of NOx and $SO_2$. Many of the flue-gas treatment processes have been developed in Japan, where NOx emission limits are generally stricter than in the United States.

Dry flue-gas treatment processes are normally preferred over wet processes because (1) they usually involve less equipment, and (2) they generally produce less waste that requires disposal. Most dry processes, however, share one characteristic with wet processes: they are both very expensive.

A number of dry processes are either commercially available or are well along in development. They range from catalytic and noncatalytic reduction to absorption processes and irradiation with electron beams. Today, the most popular flue-gas treatment process by far, at least for utility boilers, is selective catalytic reduction (SCR). In SCR, ammonia is used as a reducing agent. In the process, NOx is reduced to $N_2$ and $H_2O$ by ammonia at 300 to 400 C. in the presence of a catalyst. Ammonia is an acceptable reducing agent for NOx in combustion gases because it selectively reacts with NOx while other reducing agents, such as $H_2$, CO, and methane, readily react with $O_2$ in the gases. The catalyst that are employed are normally precious metals, such as platinum, rhodium, palladium, ruthenium, osmium or iridium, or combinations thereof. SCR processes are very expensive primarily because of these precious metals that are required.

Recently, while conducting SCR experiments, the Inventor discovered that vermiculite, a low-cost silicate mineral, could be used as a catalyst instead of precious metals to achieve NOx reductions. Vermiculite has long been suspected of having catalytic properties, but a review of the literature has shown that no one has ever considered it as a NOx catalyst. Not only did the Inventor achieve good NOx reductions with ammonia injections and vermiculite, he also discovered that NOx reductions occurred over a wider temperature range than with typical SCR processes employing precious metal catalysts.

DETAILED DESCRIPTION OF INVENTION

This invention relates to a dry method for destroying the nitrogen oxides that may be present in flue gases by reducing them effectively to nitrogen and water and/or $CO_2$. The method consists of two critical steps: (1) the mixing of ammonia or methane with the flue gas; and (2) the passage of the combination of ammonia or methane and flue gas through a bed of expanded vermiculite. Of the two reactive gases, ammonia is preferred. By simply mixing ammonia or methane with a flue gas containing NO and $NO_2$ at ambient temperatures and pressures, a large percentage of the $NO_2$ is reduced to nitrogen, but essentially no reactions involving the NO occur. However, by passing the mixed gases through a bed of vermiculite, which acts as a catalyst, the remaining $NO_2$ is reduced to nitrogen and water and/or $CO_2$, and much of the NO is reduced in a similar manner.

The amount of ammonia or methane that is added to the flue gas is important to achieving satisfactory NOx reduction. One can obtain reductions with additions equivalent to a mole ratio of ammonia or methane to NO and $NO_2$ in the flue gas of as low as 0.5, but NOx in these cases is not completely destroyed. For high degrees of destruction, it is necessary to employ mole ratios of 1.0 or higher. When ratios above 1.0 are employed, residual ammonia or methane generally occurs in the outgoing flue gas stream, which is usually not desirable. A mole ratio range of 0.8 to 1.1 is preferred to obtain a balance between good NOx destruction and little or no residual ammonia or methane in the exiting flue gas.

Vermiculite can serve as a satisfactory catalyst for NOx destruction over a wide temperature range. It was observed to perform satisfactorily at contact temperatures of 20 to 600 C.

Ammonia or methane may be added to the flue gas by any one of a number of different ways. Approaches to add ammonia that were employed successfully by the Inventor included (1) as a direct gaseous addition to the flue gas; (2) in the form of ammonium hydroxide sprayed directly into the flue gas; (3) in the form of ammonium hydroxide sprayed continuously onto the top surface of the vermiculite bed; and (4) in the form of ammonium hydroxide mixed thoroughly with the vermiculite before introducing and preparing the bed. Of these approaches, the use of a direct gaseous addition of ammonia to the flue gas is preferred. Such an approach is also preferred for methane additions.

The literature, particularly the patent literature, contains many discussions of ideas and research work relating to the removal of NOx from flue gases from stationary sources. Three basic approaches have been used in the past to remove nitrogen oxides from waste gases. These approaches are (1) absorption of the oxides by water or alkali solutions, (2) absorption by a solid absorbent, such as activated carbon, with no reactive gas additions to the flue gas, and (3) catalytic reduction. For the first two approaches, very large pieces of equipment, such as absorption towers, are normally required to treat the waste gases. In addition, with these approaches, it is generally difficult economically to reduce the concentration of nitrogen oxides in the waste gases to below 200 ppm. With catalytic reduction, on the other hand, good reductions have been seen. However, in most catalytic processes to date, platinum group metals have been used as catalysts. The useful life of these catalysts have not been sufficient for the adequate removal of nitrogen oxides and have made most processes prohibitively expensive.

In general, three classes of catalyst methods have been employed in the paste. The first class involves mixing the waste gas with methane or with another gaseous fuel before exposing the waste gas to a catalyst; the second class involves mixing the waste gas with ammonia before exposing it to a catalyst; and the third class involves direct exposure to a catalyst with no methane or ammonia additions. Many scores of materials have been proposed as catalysts. Generally speaking, however, most inventors have employed one or more metals from the platinum group in one form or another.

PROCESSES INVOLVING METHANE

Cohn in U.S. Pat. No. 3,118,727 describes a process for purifying waste gases containing oxides of nitrogen by mixing a fuel, such as methane, and passing the mixture over a rhodium or palladium-containing catalyst at an initial reaction temperature of about 690° to 780° F. The catalyst may be rhodium and/or palladium on a suitable support or rhodium or palladium in mixture with another of the platinum group metals. Suitable supports are said to be alumina, silica, kieselguhr, silica gel and diatomaceous earth.

Acres and Hutchings in U.S. Pat. No. 3,806,582 describe a similar process for the purification of gases containing noxious oxides of nitrogen. In their process, a gas containing the nitrogen oxides and including oxygen and a gaseous reducing fuel, preferably mostly methane, is passed at a temperature above the ignition temperature of the gas and fuel through a catalyst comprising an inert material impregnated or coated with a mixture or alloy of platinum and rhodium metals where rhodium is present in an amount of between 20 and 50 wt %.

Childers, Ellis, and Ryan in U.S. Pat. No. 2,910,343 describe the catalyst reduction of nitrogen oxides in stack gases with the use of methane or another fuel and two catalyst beds in series, the first bed containing platinum or alumina and the second bed containing nickel or alumina.

Nonnenmacher and Kartte in U.S. Pat. No. 3,279,884 employ vanadium oxide, molybdenum oxide and/or tungsten oxide catalysts on alumina or silicic acid substrates in combination with methane. Reitmeier in U.S. Pat. No. 2,924,504 provides a catalytic process in which gases containing nitrogen oxides are purified by employing a reducing gas, such as methane, and a catalyst of a base metal, such as iron, cobalt, nickel and copper, dispersed upon a refractory carrier, such as a high-temperature alumina, bentonite, diaspore, fire clay, pipe clay, meerschaum, titania, zirconia or magnesia.

Other patents relating to the use of methane and precious metal catalysts for the removal of nitrogen oxides from a waste or tail gas include those of Andersen and Green (U.S. Pat. No. 2,970,034), of Romeo (U.S. Pat. No. 3,425,803), of Newman (U.S. Pat. No. 3,467,492), of Kandell and Nemes (U.S. Pat. No. 3,567,367), of Andersen, Romeo, and Green (U.S. Pat. No. 3,098,712), and of Hardison and Barr (U.S. Pat. No. 3,402,015).

PROCESSES INVOLVING AMMONIA

Lee and Kline in U.S. Pat. No. 3,864,451 describe a method for removing nitric oxide, in the presence of sulfur dioxide, from combustion flue gases. The process involves mixing ammonia with the flue gas, the volume of ammonia being at least equal to the volume of nitrogen oxide, and contacting the resulting mixture of flue gas and ammonia with a catalyst selected from the group consisting of platinum group metals, such as platinum, and transition metals, such as vanadium, molybdenum, nickel, copper, cobalt, chromium, oxides thereof and mixtures thereof. The temperature of the catalyst is between 525 and 700 F. in the case of platinum and between 500 to 1000 F in the case of the other catalysts.

Andersen and Keith in U.S. Pat. No. 3,008,796 describe the use of ammonia in combination with cobalt, nickel or iron or combinations of these metals supports on alumina, silica, silica gel or diatomaceous each for selectively removing the oxides of nitrogen from waste or tail gases.

Other patents relating to the use of ammonia and precious metal catalysts for the removal of nitrogen oxides from a waste or tail gas include those of Keith and Kenah (U.S. Pat. Nos. 3,245,920 and 3,328,155), and of Cohn, Steele, and Andersen (U.S. Pat. No. 2,975,025).

PROCESSES WITH NO METHANE OR AMMONIA

In a process developed by Harris, Morello, and Peters (U.S. Pat. No. 3,459,494), nitrogen oxide is removed from a gas stream by converting it to nitrogen and oxygen by using an alkali metal oxide or silicate, or an alkaline metal oxide or silicate, or combinations of these, supported on Alundum cement, porcelain, silica, extruded alumina, or alumina beads. Examples of oxides and silicates employed include CaO, SrO, BaO, Ba2SiO4, Cs2O, K2O and Na2O. No methane or ammonia additions are described.

Ryason in U.S. Pat. No. 3,454,355 found that both SO2 and NOx may be effectively removed from flue gases by contacting the flue gas at a temperature of at least 750 F. with a heavy metal catalyst on an alumina support, wherein the flue gas contains at least 0.75 molecule of CO for each oxygen atom present in SO2 and NOx. The metal catalysts employed were copper, silver, nickel, molybdenum, palladium and cobalt, although the inventor claims all metals with atomic numbers of 29 through 47.

LaHaye, Craig, and Twrecek in U.S. Pat. No. 3,816,595 describe the use of a reactive matrix of silicon carbide for the removal of nitrogen oxides at elevated temperatures. No methane or ammonia additions are made. Flue gas is passed over or through the silicon carbide during which time the nitrogen oxides in the flue gas react with the silicon carbide to form nongaseous oxides and nitrides which are occluded in or on the carbide.

Copper is also employed as a catalyst in processes developed by Gehri (U.S. Pat. No. 3,718,733) and by Frevel and Kressley (U.S. Pat. No. 3,682,585). Veal (U.S. Pat. No. 3,050,363) used an anhydride of an inorganic acid, such as iodine pentoxide and chromium trioxide, as a catalyst.

According to a process described by McCrea and Myers in U.S. Pat. No. 3,880,618, both sulfur oxides and nitrogen oxides can be removed from a flue gas by cooling the gas to 75 to 150 C. and passing it over alkalized alumina or an alkali metal carbonate or oxide, such as sodium carbonate. The absorbent is regenerated by first heating to 300 to 400 C. to drive off NO, and then heating to 600 to 700 C to drive off absorbed sulfur compounds. Tayeyama, Endoh and Masuda in U.S. Pat. No. 3,864,450 employ carbon (semicoke) containing sodium hydroxide and/or potassium hydroxide to reduce nitrogen oxides to nitrogen at temperatures between 250 to 480 C. No methane or ammonia additions are used. Kranc and Lutchko in U.S. Pat. No. 3,576,596 describe the use of a combination of copper and chromium impregnated on carbon supports to remove both nitric oxide and carbon monoxide from a waste gas. Johswitch in U.S. Pat. No. 3,502,427 describes the use of activated carbon alone for the removal of SO2 from a waste gas.

STRAIGHT SORPTION PROCESSES WITH NO CATALYSTS

A number of straight sorption techniques have been developed to remove nitrogen oxides.

Kyllonen (U.S. Pat. No. 3,498,743) describes a process employing sodium carbonate, calcium carbonate or calcium oxide under critical conditions of temperature and water vapor content. Kitagawa (U.S. Pat. No. 3,382,033) developed a dry method using FeSO4, Na2O2 and NaClO2 on a porous carrier to remove nitrogen oxides. In his patent, he claims other inorganic salts such as PbSO4, KMnO4, KClO3, NaClO, Na2MO4, K22O3, N2S2O3 and Na2HPO4 and inorganic oxides such as AsO3 and PbO2 as suitable agents. Collins in U.S. Pat. No. 3,674,429 describes a two-step process for removing nitrogen oxides involving a silica gel and an activated crystalline zeolitic molecular sieve.

Ogg and Ray (U.S. Pat. No. 2,684,283) employ what they call an oxsorbent, a combination of an oxidation promoting catalyst and an alkaline adsorbent, to remove nitrogen oxides. Their preferred oxsorbent is NaNO3 and FE2O3. Lefrancois and Barclay (U.S. Pat. No. 3,671,185) used molten sodium, potassium and/or lithium carbonate for NOx and SO2 removal. Batholomew and Garfinkel (U.S. Pat. No. 3,552,912) employed molten sodium and/or potassium hydroxide for NO2 removal and molten sodium, potassium and/or silver nitrates for SO2 removal.

VERMICULITE USE IN NOx PROCESSES

Evanshen in U.S. Pat. No. 3,757,489 describes the treatment of flue gases with polyvinylpyrrolidone with or without the addition of a nitrate or sulfate of copper or silver. Evanshen suggests suspending the materials on a carrier, such as vermiculite. Vermiculite has been employed in the past as a carrier for other materials. For example, it has been and is used as a carrier for nitrates and phosphates, where the combinations are used as slow-release fertilizers. However, no one before this time has discovered that unaltered, expanded vermiculite, by itself, can be employed satisfactorily as a catalyst for the removal of NOx from waste gases. No one has performed extensive tests on vermiculite alone with ammonia or methane and has obtained the surprising results that are presented herein.

Reference will now be made to three examples that deal with embodiments of the present invention.

EXAMPLE 1

The effectiveness of mixing gaseous anhydrous ammonia with a flue gas to reduce NOx and the relative effectiveness of four materials to promote the reduction of NOx to N2 at room temperature were examined in a series of experiments. The four bed materials were expanded vermiculite, activated carbon, PVC microspheres, and silica sand. The PVC and silica sand presented significant resistance to gas flow, while the vermiculite and activated carbon did not. The effectiveness of mixing and the relative performance of the four materials are shown in Table I.

TABLE I

| | Flue Gas Composition (ppm) | | | | | |
|---|---|---|---|---|---|---|
| | Before NH3 Introduction | | After Introduction & Before Bed | | After Bed | |
| Bed Material | NO | NO2 | NO | NO2 | NO | NO2 |
| Vermiculite | 190 | 650 | 190 | 155 | 90 | 2 |
| Activated Carbon | 190 | 650 | 200 | 175 | 180 | 0 |
| PVC | 190 | 650 | 190 | 150 | 190 | 60 |
| Silica Sand | 190 | 650 | 200 | 200 | 190 | 70 |

TABLE II

| | Flue Gas Composition (ppm) | | | |
|---|---|---|---|---|
| | Before Bed | | After Bed | |
| Bed Temperature | NO | NO2 | NO | NO2 |
| 20 C. | 180 | 100 | 115 | 0 |
| 300 C. | 200 | 120 | 130 | 15 |
| 500 C. | 190 | 100 | 108 | 0 |
| 600 C. | 200 | 100 | 130 | 0 |

TABLE III

| | Flue Gas Composition (ppm) | | | |
|---|---|---|---|---|
| | Before Bed | | After Bed | |
| Reactive Gas Addition | NO | NO2 | NO | NO2 |
| Methane | 180 | 100 | 130 | 5 |
| Ammonia | 180 | 100 | 115 | 0 |

EXAMPLE 2

The effects of changes in the temperature of the vermiculite bed on NOx reduction were investigated in another series of experiments. In these tests, anhydrous ammonia in amounts equivalent to 0.8 to 1.1 moles of NH3 to one mole of NO and NO2 in the flue gas was added to a flue gas stream containing 190 ppm NO and 650 ppm NO2. The gases were permitted to mix in a long chamber and were then passed through a 40 g bed of expanded vermiculite held at different temperatures. Four temperatures, 20 C., 300 C., 500 C. and 600 C., were examined. The results shown in Table II indicated that no significant changes in NOx removal occurs with changes in temperatures within the temperature range 20 to 600 C.

EXAMPLE 3

An experiment was performed in which methane in amounts equivalent to 0.8 to 1.1 moles of CH4 to one mole of NO and NO2 in the flue gas was added to a flue gas stream containing 190 ppm NO and 650 ppm NO2. Like in Example 2, the gases were permitted to mix in a long chamber and were passed through a 40 g bed of expanded vermiculite at 20 C. The results, given in Table III, showed that vermiculite beds with methane, like ammonia, can be used to reduce the NOx levels in flue gases.

What is claimed is:

1. A process for destroying nitrogen oxides in flue gases comprised of the following steps:
   (A) Injecting a reactive gas selected from the group consisting of ammonia and methane into the flue gas stream;
   (B) Passing the combination of flue gas and reaction gas through a bed of expanded vermiculite, whereby the nitrogen oxides are reduced to gaseous nitrogen.

2. A processing according to claim 1, wherein the reactive gas is ammonia.

3. A process according to claim 2, wherein the rate of ammonia injection is such that the mole ratio of the ammonia injected into the flue gas to the NO and NO2 in the flue gas exceeds 0.5, and preferably is within the range of 0.8 to 1.1.

4. A process according to claim 1, wherein the temperature of the vermiculite bed is within the range 20 to 600 C.

5. A process for destroying nitrogen oxides in flue gases comprised of injecting ammonia into the flue gas stream in such a manner that the mole ratio of ammonia injected to NO and NO2 in the flue gas exceeds 0.5, and preferably is within the range 0.8 to 1.1, and passing the combination of flue gas and ammonia through a bed of expanded vermiculite where the contact temperature is in the range of 20 to 600 C.

* * * * *